(12) United States Patent
Cappello

(10) Patent No.: US 12,390,762 B1
(45) Date of Patent: Aug. 19, 2025

(54) PLANT AND METHOD TO IMPROVE THE EFFICIENCY OF $CO_2$ CAPTURE AND STORAGE USING PRECIPITATED CALCIUM CARBONATE

(71) Applicant: LIMENET S.R.L. SOCIETÀ BENEFIT, Galbiate (IT)

(72) Inventor: Giovanni Cappello, Galbiate (IT)

(73) Assignee: LIMENET S.R.L. SOCIETÀ BENEFIT, Galbiate (IT)

( * ) Notice: Subject to any disclaimer, the term of this patent is extended or adjusted under 35 U.S.C. 154(b) by 0 days.

(21) Appl. No.: 19/100,183

(22) PCT Filed: Jul. 28, 2023

(86) PCT No.: PCT/IB2023/057676
§ 371 (c)(1),
(2) Date: Jan. 31, 2025

(87) PCT Pub. No.: WO2024/028721
PCT Pub. Date: Feb. 8, 2024

(30) Foreign Application Priority Data

Aug. 1, 2022 (IT) .......................... 102022000016347

(51) Int. Cl.
*B01D 53/62* (2006.01)
*B01D 53/34* (2006.01)
(Continued)

(52) U.S. Cl.
CPC ........... *B01D 53/62* (2013.01); *B01D 53/346* (2013.01); *C01B 32/50* (2017.08); *C01F 11/02* (2013.01);
(Continued)

(58) Field of Classification Search
CPC ...... B01D 53/62; B01D 53/346; C01B 32/50; C01F 11/02; C01F 11/181
(Continued)

(56) References Cited

U.S. PATENT DOCUMENTS 5,792,440 A    8/1998   Huege

FOREIGN PATENT DOCUMENTS

JP     S60206489 A      10/1985
WO     2022/137038 A1   6/2022

OTHER PUBLICATIONS

International Search Report issued on Nov. 24, 2023, in corresponding International Application No. PCT/IB2023/057676, 3 pages.
(Continued)

*Primary Examiner* — Anita Nassiri-Motlagh
(74) *Attorney, Agent, or Firm* — Maier & Maier, PLLC

(57) ABSTRACT

A plant and a method to improve the efficiency of $CO_2$ capture and storage from the atmospheric air, using precipitated calcium carbonate (PCC) and calcium bicarbonates. The plant includes an electric calciner, a contactor, an apparatus for pH correction, a dosing device for the buffering substance, an absorber/precipitator, a separator, and a PCC dosing device. The system is suitable for receiving at the inlet electric energy, carbonate, water, a flow of atmospheric air and for releasing a flow of $CO_2$-lean air, a buffered ionic mixture, and a flow of excess PCC. The plant uses the bicarbonates or carbonates as permanent $CO_2$ storage: this storage allows a cost-effective $CO_2$ storage in modular plants.

10 Claims, 8 Drawing Sheets

(51) Int. Cl.
 *C01B 32/50* (2017.01)
 *C01F 11/02* (2006.01)
 *C01F 11/18* (2006.01)

(52) U.S. Cl.
 CPC ...... *C01F 11/181* (2013.01); *B01D 2251/404* (2013.01); *B01D 2251/606* (2013.01); *B01D 2257/504* (2013.01)

(58) Field of Classification Search
 USPC ........................................................ 423/220
 See application file for complete search history.

(56) References Cited

OTHER PUBLICATIONS

Written Opinion issued on Nov. 24, 2023, in corresponding International Application No. PCT/IB2023/057676, 9 pages.
Caserini et al., "Buffered accelerated weathering of limestone for storing CO2: Chemical background", International Journal of Greenhouse Gas Control, 112 (2021) 103517, 10 pages.
Rinder et al., "The influence of particle size on the potential of enhanced basalt weathering for carbon dioxide removal—Insights from a regional assessment", Journal of Cleaner Production, 315 (2021) 128178, 13 pages.

PLANT AND METHOD TO IMPROVE THE EFFICIENCY OF $CO_2$ CAPTURE AND STORAGE USING PRECIPITATED CALCIUM CARBONATE

FIELD

Object of the present invention is a method and a plant to improve the efficiency of $CO_2$ capture and storage using precipitated calcium carbonate (PCC).

BACKGROUND

The effects of the so-called "greenhouse gases" on the climate and especially the correlation between the concentration of $CO_2$ (carbon dioxide) in the atmosphere and global warming have long been known.

The efforts of the scientific community and world politics in recent years have been concentrated on trying to counteract the increase in the greenhouse gas emissions into the atmosphere, in order to avoid the phenomenon of global warming, i.e. the rise in the average temperature at a global level.

In a per se known manner, a number of initiatives have been promoted at international level aimed at limiting the $CO_2$ emissions into the atmosphere: the Kyoto Protocol in 1997 and the Paris Agreement in 2015, among others, are worth mentioning.

The forms identified by the scientific community to avoid global warming are many and substantially concern the decrease in the use of fossil fuels such as coal, oil and natural gas favouring the development of renewable energies such as hydraulic, wind, solar energy, from biomass and of zero-emission fuels such as hydrogen or ammonia.

In addition, many efforts of the international community are focused on improving the efficiency in the use of energy, as in the case of lighting with low-consumption lamps, on the transport with new generations of high-efficiency engines and, in the field of power generation, on replacing old, inefficient coal- or oil-fired power stations with new combined-cycle gas turbine and steam turbine plants with energy efficiencies approaching 60%.

Despite the on-going technological efforts in the most advanced nations, the forecasts of well-known international institutions on the need for energy globally over the next few years indicate a sharp increase in the demand for electric energy, thermal energy for industry and fuels for transport.

Consequently, these forecasts indicate a steady increase in the use of fossil sources such as oil, coal and natural gas, especially by emerging, newly industrialized and developing countries. This consumption is in fact favoured by the huge availability of these resources and by the discovery of new deposits and techniques for the extraction thereof, which factors altogether make these energy sources economically advantageous.

Using the data provided by these authoritative studies, not only a decrease in $CO_2$ emissions to combat global warming is not expected globally, but a substantial increase in the emissions themselves is instead expected over the next 50 years, mainly due to the increase in world population and to the new industrialization of entire countries.

The catastrophic effects of such a situation on the climate are easy to understand and difficult to avoid especially because developing nations believe that the renewable energy option is too sophisticated and costly and are more oriented towards short-term economic development programmes than towards $CO_2$ emission containment and environmental issues.

The scientific and industrial communities are committed to designing and industrializing processes that allow not only to reduce the $CO_2$ emissions produced by the process itself but that have as a co-benefit the capture and storage of additional $CO_2$ through mineralization processes.

One of the most interesting sectors from this point of view is the one that takes into consideration the calcination of carbonate rocks, the storage of $CO_2$ and the use of hydroxide for the capture of $CO_2$ from the air by carbonation.

In a per se known manner, the main technologies for $CO_2$ capture and storage by using hydroxides are:
 the technology proposed by Carbon engineering Ltd. through, but not only, the U.S. Pat. No. 8,728,428B1
 the technology proposed by Heirloom through the patent application: PCT/US2020/039265
 the technology proposed by Caserini et al. 2019 in the article: "Buffered accelerated weathering of limestone for storing $CO_2$: Chemical background"

In a per se known manner the above-mentioned technologies require a permanent storage of the $CO_2$ produced by the calcination process that is external to the proposed technology of using the hydroxide as a medium to capture $CO_2$ by carbonation of hydroxides.

The dependence of said technologies on a permanent storage of $CO_2$ produced by the process of calcination of the carbonates that severely limits their application and the absence of a commercial use of the carbonate or bicarbonate produced limits their economic viability.

In a per se known manner, the only forms currently available for the permanent storage of $CO_2$ for the technologies mentioned above are those known as geological CCS (Carbon Capture and Sequestration) which, nonetheless, are encountering considerable difficulties in implementation due to the long timescales for the identification of the geological storage sites, the large size of the projects to obtain economies of scale and the opposition of the population for the CCS made on land.

In a per se known manner, a method for the production of decarbonized hydroxide by storing the $CO_2$ produced by the calcination process in the form of bicarbonates in seawater has been proposed by means of patent application PCT/IB2021/061832 "Plant and method for the production of decarbonized oxide or hydroxide using carbonate and electric energy".

In a per se known form, one of the most commercially interesting products that can be produced starting from a hydroxide and that represents a permanent mineralization of $CO_2$ is precipitated calcium carbonate or PCC.

The PCC represents a stable storage of $CO_2$ that has reacted with the hydroxide and is considered as such also by the European legislation "Commission Implementing Regulation (EU) 2018/2066" of 19 Dec. 2018.

In a per se known form, the PCC is used in various commercial sectors such as, to name the most important, that of paper, plastics, the food sector and the construction one. The PCC market worldwide is greater than 100 million tons/year and represents a product with high added value.

SUMMARY

As can be immediately understood, it is necessary to identify a technology that allows the capture and storage of $CO_2$ from atmospheric air by carbonation of hydroxides. At the same time, this technology must make it possible to store the $CO_2$ produced during the calcination process and generate a commercially usable product, possibly with zero impact, "carbon free".

The task of the present invention is to make available a method and a plant that allows the efficient generation of precipitated calcium carbonate (PCC) using the $CO_2$ present in the air through the electrical calcination of carbonates, the permanent storage of the $CO_2$ produced in the calcination process in the form of bicarbonates in seawater and the subsequent carbonation of the hydroxide in the form of precipitated calcium carbonate (PCC). The same invention substantially improves the possibilities of industrial application of the carbonation compared to the known technologies.

This object and these tasks are achieved by means of a plant according to claim 1 and by means of a method according to claim 8.

BRIEF DESCRIPTION OF THE DRAWINGS

In order to better understand the invention and appreciate its advantages, some exemplary and non-limiting embodiments thereof are described below, with reference to the attached drawings, in which.

DETAILED DESCRIPTION OF EMBODIMENTS

Figure 1:
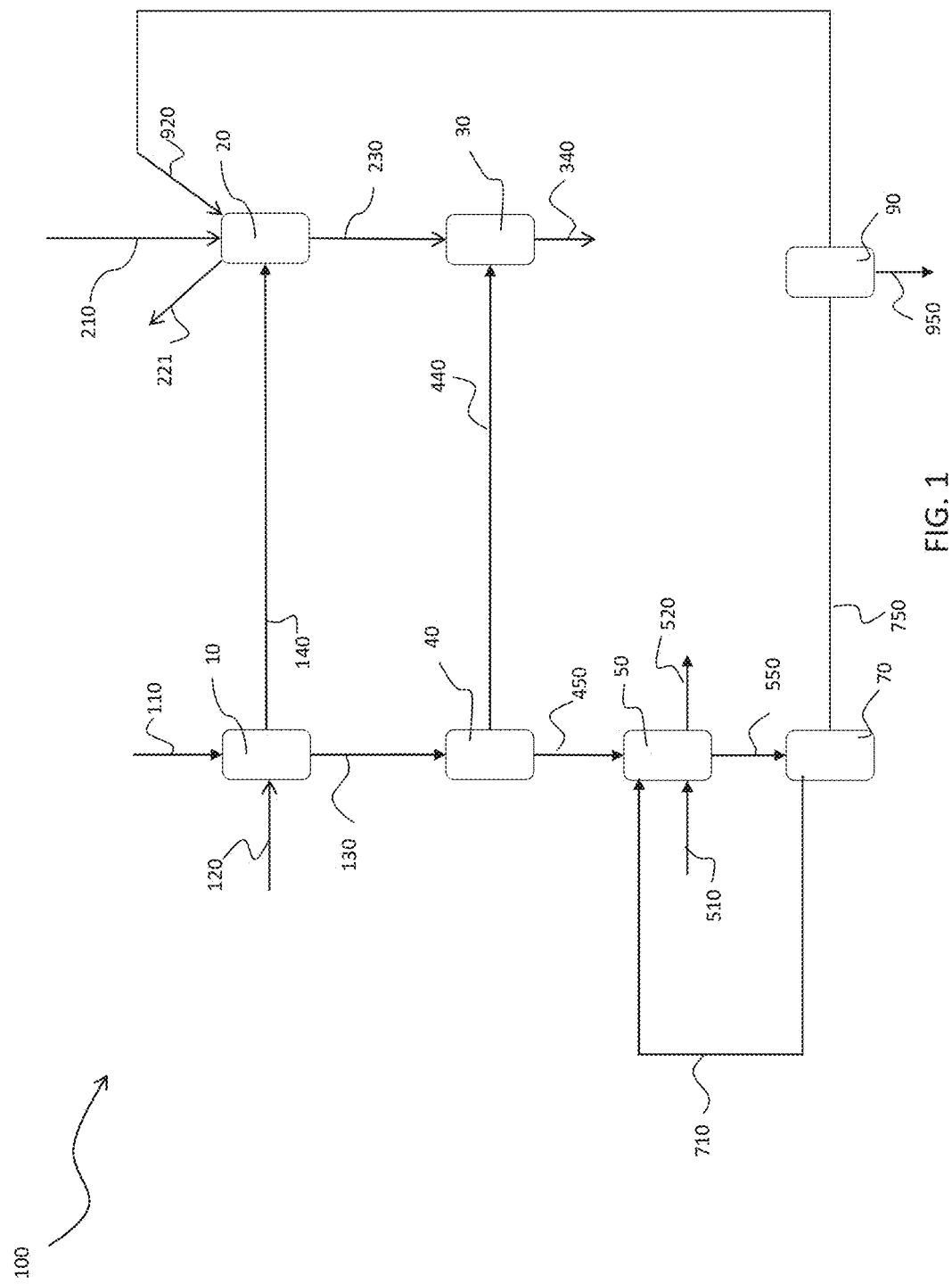
FIG. 1 is a schematic view of a plant to improve the efficiency of $CO_2$ capture and storage according to the invention.

In the description, reference will also be made to "carbonic gas" meaning thereby a mixture of gas containing mainly $CO_2$, and possibly other substances, including $N_2$, $O_2$, $H_2O$, Ar, while when it is intended to refer to the chemical element $CO_2$ (carbon dioxide) alone in the description, $CO_2$ will be used.

In the description, reference will also be made to "non-soluble" gases, meaning thereby the set of gases that are poorly soluble in water, including $N_2$ and Ar.

In the description reference will also be made to "atmospheric air" meaning thereby the atmospheric air having a $CO_2$ content of about 420 ppm at the time of writing the present document.

In the description, reference will also be made to "lean air", meaning thereby air with a lower amount of $CO_2$ than the "atmospheric air": this "lean air" is obtained by passing the "atmospheric air" through an "absorber/precipitator" where at least $CO_2$ is removed in whole or in part.

In the description, reference will also be made to "water", meaning thereby seawater in the liquid phase with the chemical and physical characteristics necessary for use in the process according to the invention, while when it is intended to refer to the chemical element $H_2O$ alone in the description, $H_2O$ will be used.

In the description, reference will also be made to the "sea", meaning thereby the sea as such but also the ocean, or any body of salt water.

In the description, reference will also be made to "carbonate", meaning thereby any calcareous or dolomitic sedimentary rock such as calcite, aragonite, dolomite, siderite, magnesite, marble, but also any other carbonate material such as shells or corals.

In the description, reference will also be made to "water vapour", meaning thereby water in the gaseous phase with the chemical and temperature characteristics necessary for use in the process according to the invention.

In the description reference will also be made to the "electric calciner" (or electric kiln), meaning thereby any controlled-atmosphere electric apparatus, known per se, capable of calcining the carbonate according to the reactions $CaCO_3 \rightarrow CaO+CO_2$ (+183 kj/mol) or $MgCO_3 \rightarrow MgO+CO_2$ (+118 kj/mol). The calcination process, per se known, takes place at temperatures preferably comprised between 600° C. and 1200° C. and is an endothermic process. The controlled-atmosphere electric calciner does not allow direct contact of the calcination zone with the ambient air whilst it allows flushing the calcination zone possibly with water vapour.

In the description, reference will also be made to the "oxide", meaning thereby the product of the calcination formed mainly by calcium oxide CaO or magnesium oxide MgO and to a lesser extent by other materials present in the carbonate rock with which the calciner is fed.

In the description, reference will also be made to the "hydroxide", meaning thereby the product of the hydration of calcium oxide $Ca(OH)_2$ or of magnesium oxide $Mg(OH)_2$ with the following chemical reactions:

$$CaO+H_2O \rightarrow Ca(OH)_2 \; (-64.8 \text{ kj/mol})$$

$$MgO+H_2O \rightarrow Mg(OH)_2 \; (-37.0 \text{ kj/mol})$$

In the description, reference will also be made to the "hydroxide production unit" (slaker), meaning thereby any device capable of reacting calcium oxide with water according to the reaction:

$$CaO+H_2O \rightarrow Ca(OH)_2$$

where Ca can be replaced with Mg in case it was present in the carbonate rock.

In the description, reference will be made to "bicarbonates", meaning thereby the chemical compounds:

$$Ca(HCO_3)_2 \text{ and/or } Mg(HCO_3)_2.$$

In the description, reference will be made to "impurities", meaning thereby the foreign substances present in the carbonate that do not take part in the chemical reactions in the reactor according to the invention.

In the description, reference will be made to the "contactor", meaning thereby a reactor in which $CO_2$, water and possibly carbonate are reacted according to the reactions:

$$CO_{2(aq)}+H_2O_{(l)} \rightleftharpoons H_2CO_{3(aq)} \rightleftharpoons H_{(aq)}^+ + HCO_{3(aq)}^-$$
and $$CaCO_3+CO_2+H_2O \rightarrow Ca(HCO_3)_2$$

where Ca can be replaced with Mg in case it was present in the carbonate rock. This reactor is known as "limestone contactor" or "calcite contactor" and is normally used for remineralizing drinking water from reverse osmosis plants and can be with fixed bed (updraft or downdraft), fluidized bed, either pressurised or atmospheric.

In the description, reference will be made to the "ionic mixture", meaning thereby a mixture where the carbonate, if present, has dissolved and $Ca^{2+}$ or $Mg_2^+$ are in ionic form. By "ionic mixture" is meant also the mixture of water and $CO_2$ alone.

In the description, reference will be made to the "buffered ionic mixture", meaning thereby an ionic mixture in which the pH has been corrected to the desired value by addition of an oxide or a hydroxide.

In the description, reference will be made to the "aqueous solution" meaning thereby any aqueous solution as such but also an ionic mixture, buffered ionic mixture or water coming from the sea.

In the description, reference will be made to the "process parameters meter" meaning thereby any device suitable for measuring the chemical parameters such as pH and/or the alkalinity and/or the hardness and/or DIC (dissolved inorganic carbon) and/or TOC (total organic carbon) and/or the conductivity of an aqueous solution but also physical parameters such as temperature and/or flow rate of the fluid and/or pressure and/or turbidity.

In the description, reference will be made to the "control unit", meaning thereby any device, preferably electronic, capable of controlling, processing, storing and interpreting information coming from one or more process parameters meters.

In the description, reference will be made to the "dosing device", meaning thereby any device capable of dosing and introducing a specific amount of material or substance into a system or circuit, such as peristaltic pumps, eccentric screw pumps, augers and extruders. The "dosing device" can be controlled by specific control units thanks to the information coming from process parameters meters.

In the description, reference will also be made to the "apparatus for pH correction", meaning thereby a reactor in which the ionic mixture is reacted with the oxides or hydroxides coming from the dosing device according to the reactions:

$$CaO_{(s)} + H_2O + 2CO_{2(aq)} \rightarrow Ca(HCO_3)_{2(aq)}$$

or $$Ca(OH)_{2(aq)} + 2CO_{2(aq)} \rightarrow Ca(HCO_3)_{2(aq)}$$

in order to obtain a buffered ionic mixture, where Ca can be replaced by Mg in case it was present in the carbonate rock.

In the description, reference will be made to the "absorber/precipitator", meaning thereby any device or plant capable of causing, simultaneously or in successive steps, the absorption $CO_2$-liquid and the precipitation of PCC following one of the following chemical reactions:

$$2NaOH_{(aq)} + CO_{2(g)} \rightarrow Na_2CO_{3(aq)} + H_2O$$

$$Ca(OH)_{2(aq)} + Na_2CO_{3(aq)} \rightarrow CaCO_{3(s)} + NaOH_{(aq)}$$

or $$2KOH_{(aq)} + CO_{2(g)} \rightarrow K_2CO_{3(aq)} + H_2O$$

$$Ca(OH)_{2(aq)} + K_2CO_{3(aq)} \rightarrow CaCO_{3(s)} + KOH_{(aq)}$$

(where Ca can be replaced with Mg if present in the carbonate)

The absorber/precipitator can be, in a per se known form, a plant formed by washing towers, Venturi scrubbers, filling columns, horizontal scrubbers, the bubble columns integrated with a mixing zone with the buffering substance.

In the description, reference will also be made to the "separator", meaning thereby any apparatus capable of separating a solid from a liquid such as filters, centrifuges, hydrocyclones or decanters.

In the description, reference will also be made to the "basic solution", meaning thereby the aqueous solution deriving from the separation of the PCC from the PCC suspension (described below) and with a pH higher than 8: this basic solution can be an aqueous solution of NaOH and $Na_2CO_3$ or an aqueous solution of KOH and $K_2CO_3$.

In the description, reference will be made to "$\Omega_{cal}$", meaning thereby the calcite saturation state in seawater.

In the description, reference will be made to the "pH", meaning thereby the measurement scale that indicates the acidity or the basicity of a liquid which is defined by the following formula:

$$pH = -\log_{10}[H_3O^+]$$

In the description, reference will be made to the "alkalinity", meaning thereby the amount of hydroxides $OH^-$, carbonates $CO_3^{2-}$ and bicarbonates $HCO_3^{2-}$ present in seawater.

In the description, reference will be made to the "hardness", meaning thereby a value that expresses the total content of $Ca^{2+}$ and $Mg_2^+$ ions present in seawater.

In the description, reference will be made to "bara", meaning thereby the measurement of the absolute pressure measured in bar, where 1 bar=100000 Pa.

In the description, the comma "," will be used as a thousands separator and point "." as a decimal separator.

In the description, reference will also be made to the "buffering substance", meaning thereby both the oxide and the hydroxide.

In the description, reference will also be made to the "alkaline substance", meaning thereby both the oxide and the hydroxide.

In the description, reference will also be made to the "atmosphere", meaning thereby any place in contact with the atmospheric air.

In the description, reference will also be made to the concept of "decarbonized", meaning thereby a product or a service that does not entail $CO_2$ emissions into the atmosphere, i.e. where the $CO_2$ produced by the production process has been sequestered and then stored permanently.

In the description, reference will also be made to the concept of "PCC" (precipitated calcium carbonate) meaning thereby not only the precipitated calcium carbonate formed by calcite, aragonite, vaterite crystals but also the "PMC" (precipitated magnesium carbonate), i.e. the precipitated magnesium carbonate formed by magnesite, barringtonite, nesquehonite and lansfordite crystals ranging in size from 0.01 micron to 50 microns.

In the description, reference will be made to the concept of "PCC suspension", meaning thereby an aqueous suspension of PCC. The aqueous suspension can be formed by PCC in an aqueous solution of NaOH and $Na_2CO_3$ or by PCC in an aqueous solution of KOH and $K_2CO_3$.

In the attached figures, the plant according to the invention is indicated as a whole with reference number 100.

A first aspect of the invention concerns a plant 100 to improve the efficiency of $CO_2$ capture and storage using precipitated calcium carbonate PCC. With reference to FIGS. 1 to 6, the plant 100 comprises an electric calciner 10, a contactor 20, an apparatus for pH correction 30, a dosing device for the buffering substance 40, an absorber/precipitator 50, a separator 70 and a PCC dosing device 90 wherein:

the electric calciner 10 is suitable for receiving at the inlet a flow of carbonate 110, a flow of electric energy 120 and for releasing at the outlet at least a flow of carbonic gas 140 and at least a flow of oxide 130;

the flow of oxide 130 is suitable for providing a flow of buffering substance 440, 460 and a flow of alkaline substance 450, 470;

the contactor 20 is suitable for receiving at the inlet the flow of carbonic gas 140 released by the electric calciner 10, a flow of dosed PCC 920 and a flow of water 210;

the contactor 20 is suitable for reacting the $CO_2$ present in the flow of carbonic gas 140 with the flow of water 210 and the flow of dosed PCC 920 coming from the PCC dosing device 90 according to the reactions:

$$CO_{2(aq)} + H_2O_{(l)} \rightleftharpoons H_2CO_{3(aq)} \rightleftharpoons H^+_{(aq)} + HCO^-_{3(aq)}$$
and
$$CaCO_{3(s)} + CO_{2(aq)} + H_2O_{(l)} \rightarrow Ca(HCO_3)_{2(aq)}$$

(where Ca can be replaced with Mg if present in the carbonate) and for releasing at the outlet at least a flow of ionic mixture 230 and a flow of non-soluble gases 221;

the apparatus for pH correction 30 is suitable for receiving at the inlet at least a flow of buffering substance 440; 460 and the flow of ionic mixture 230;

the apparatus for pH correction 30 is suitable for reacting the flow of ionic mixture 230 with the flow of buffering substance 440; 460 and for releasing at the outlet a flow of buffered ionic mixture 340;

the dosing device for the buffering substance 40 is suitable for receiving at the inlet a flow of buffering substance 130 or a flow of hydroxide 630 and for releasing at the outlet the predetermined flow of buffering substance 440; 460 to feed the apparatus for pH correction 30 and the flow of alkaline substance 450; 470 to feed the absorber/precipitator 50;

the absorber/precipitator 50 is suitable for receiving at the inlet the flow of alkaline substance 450; 470 released by the dosing device for the buffering substance 40, a flow of atmospheric air 510, a flow of basic solution 710 and for releasing a flow of lean air 520 and a flow of PCC suspension 550 to feed the separator 70;

the separator 70 is suitable for receiving at the inlet the flow of PCC suspension 550 and for releasing at the outlet at least a flow of PCC 750 available to the PCC dosing device 90 and the flow of basic solution 710;

the PCC dosing device 90 is suitable for receiving at the inlet the flow of PCC 750 and for releasing:
a flow of dosed PCC 920 available to feed the contactor 20;
a flow of excess PCC 950 available for any use;

and wherein the basic solution 710 is an aqueous solution comprising one or more of: NaOH, $Na_2CO_3$, KOH, and $K_2CO_3$.

In some embodiments of the plant 100 according to the invention (see for example FIGS. 1, 2 and 3), the flow of buffering substance and the flow of alkaline substance are flows of oxide 440; 450 originating from the electric calciner 10 and the apparatus for pH correction 30 is suitable for reacting the flow of ionic mixture 230 with the flow of oxide 440 according to the reaction:

$$CaO_{(s)} + H_2O_{(l)} + 2CO_{2(aq)} \rightarrow Ca(HCO_3)_{2(aq)}$$

and the absorber/precipitator 50 is suitable for reacting the flow of basic solution 710 with the flow of oxide 450.

In some embodiments of the invention (see for example FIGS. 4, 5), the plant 100 further comprises a hydroxide production unit 60 installed between the electric calciner 10 and the apparatus for pH correction 30, wherein:

the hydroxide production unit 60 is suitable for receiving at the inlet at least the flow of oxide 130; 440 originating from the electric calciner 10 and a predetermined flow of water 610;

the hydroxide production unit 60 is suitable for reacting a flow of oxide 130; 440 with the flow of water 610 according to the reaction:

$$CaO_{(s)} + H_2O_{(l)} \rightarrow Ca(OH)_{2(s)}$$

(where Ca can be replaced with Mg if present in the carbonate) and for releasing at the outlet a flow of hydroxide 630; 460;

the apparatus for pH correction 30 is suitable for reacting the flow of ionic mixture 230 with the flow of hydroxide 460 according to the reaction:

$$Ca(OH)_{2(aq)} + 2CO_{2(aq)} \rightarrow Ca(HCO_3)_{2(aq)}$$

In some embodiments of the invention (see for example FIG. 6), the plant 100 further comprises a hydroxide production unit 60 installed between the dosing device for the buffering substance 40 and the absorber/precipitator 50, wherein:

the hydroxide production unit 60 is suitable for receiving at the inlet at least a flow of oxide 450 originating from the electric calciner 10 and the predetermined flow of water 610;

the hydroxide production unit 60 is suitable for reacting the flow of oxide 450 with the flow of water 610 according to the reaction:

$$CaO_{(s)} + H_2O_{(l)} \rightarrow Ca(OH)_{2(s)}$$

(where Ca can be replaced with Mg if present in the carbonate) and for releasing at the outlet a flow of hydroxide 470.

Figure 2:
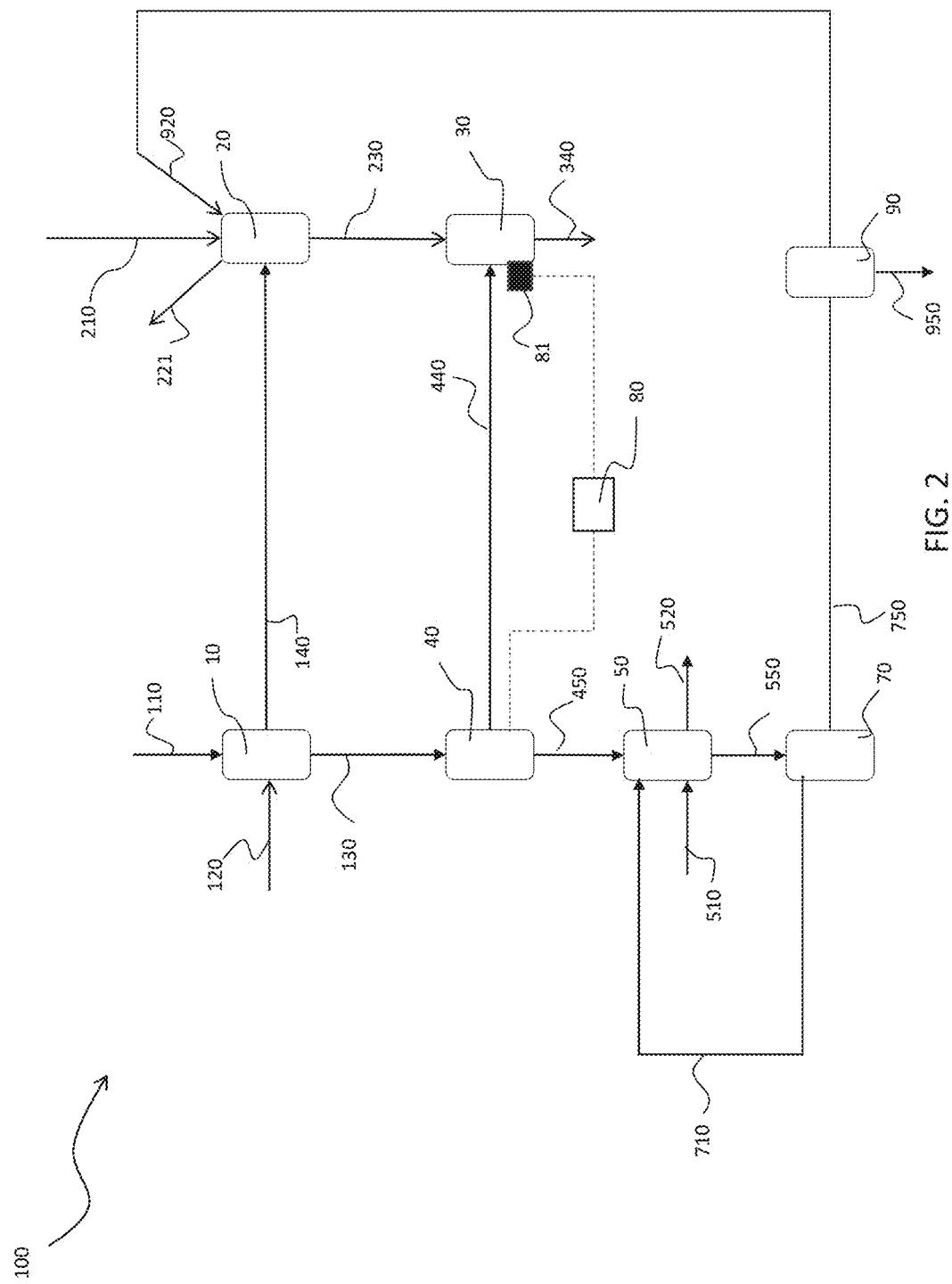
FIG. 2 is a schematic view of another possible embodiment of the plant to improve the efficiency of $CO_2$ capture and storage according to the invention.

In accordance with an embodiment of the plant 100 according to the invention and with reference to FIG. 2 the plant 100 further comprises a control unit 80 and a process parameters meter 81 for the flow of ionic mixture 230 or for the buffered ionic mixture 340. The process parameters meter 81 is also suitable for providing the measurement to the control unit 80 and the control unit 80 is suitable for controlling the dosing device for the buffering substance 40 so that it feeds to the apparatus for pH correction 30 the exact amount of flow of buffering substance 440; 460 that is adequate to obtain the buffered ionic mixture 340 with the desired pH.

Figure 3:
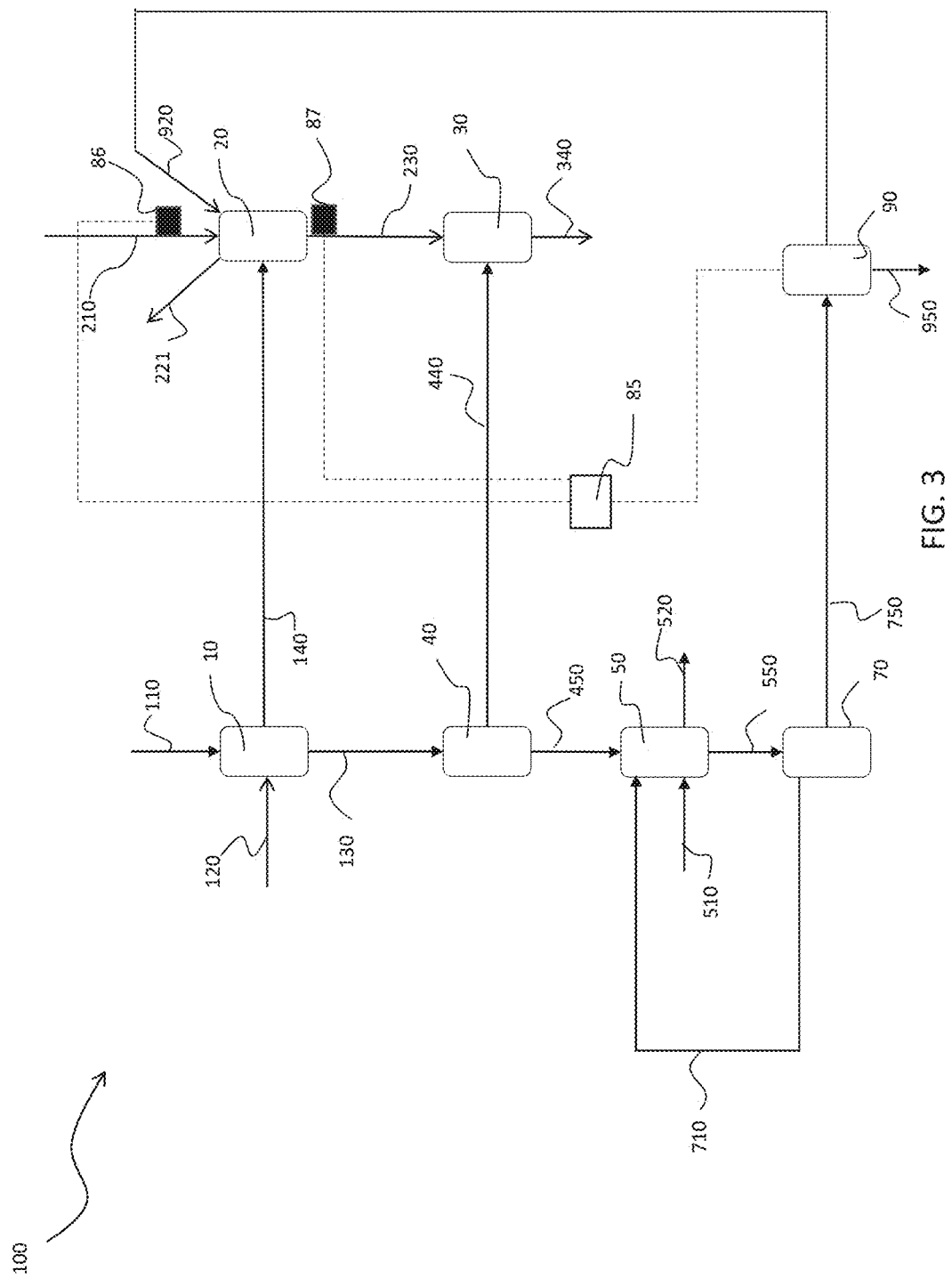
FIG. 3 is a schematic view of another possible embodiment of the plant to improve the efficiency of $CO_2$ capture and storage according to the invention.

In accordance with an embodiment of the plant 100 according to the invention and with reference to FIGS. 2 and 3 the plant 100 further comprises a control unit 85, one or more process parameters meters 86 for the flow of water 210 entering the contactor 20, one or more process parameters meters 87 for the flow of ionic mixture 230 leaving the contactor 20. The process parameters meters 86, 87 are further suitable for providing the measurements to the control unit 85 and the control unit 85 is suitable for controlling the PCC dosing device 90 so that it feeds to the contactor 20 the amount of flow of dosed PCC 920 that is adequate to obtain the flow of ionic mixture 230 with the desired pH.

Figure 4:
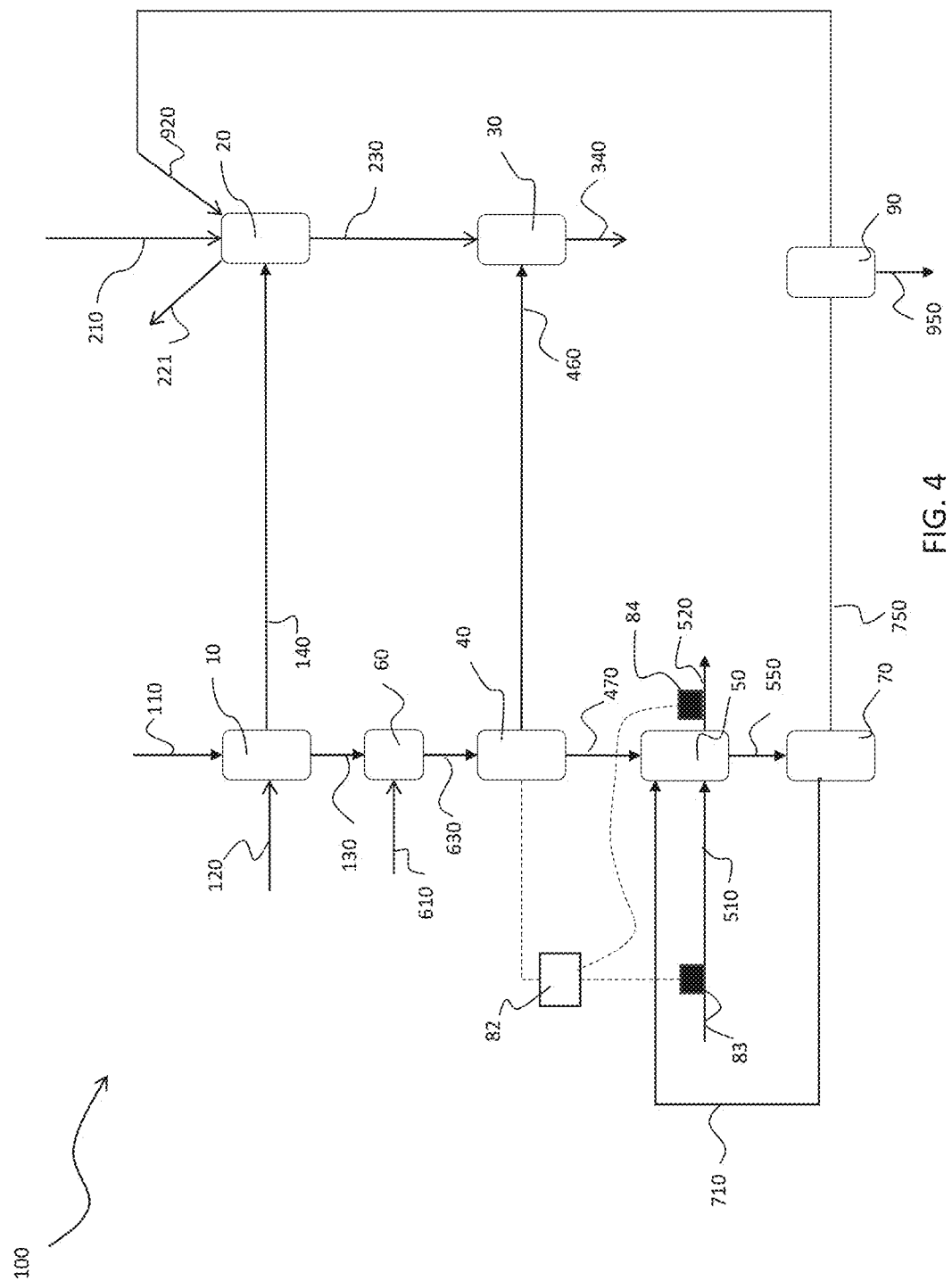
FIG. 4 is a schematic view of another possible embodiment of the plant to improve the efficiency of $CO_2$ capture and storage according to the invention.

In accordance with an embodiment of the plant 100 according to the invention and with reference to FIG. 4 the plant 100 further comprises a control unit 82 and one or more process parameters meters 83; 84 for the physical/ chemical parameters of the flow of atmospheric air 510 and/or for the flow of lean air 520 suitable for measuring $CO_2$ flow rate and/or concentration. The meters of the physical/chemical parameters of the flow of atmospheric air 510 and/or of the flow of lean air 520 are also suitable for providing the measurement to the control unit 82 which is suitable for controlling the dosing device for the buffering substance 40 so that it feeds to the absorber/precipitator 50 the exact amount of flow of alkaline substance 450; 470 that is adequate to optimize the production of a flow of PCC suspension 550 respectively according to the reactions:

$$2NaOH_{(aq)} + CO_{2(aq)} \rightarrow Na_2CO_{3(aq)} + H_2O_{(l)}$$

$$Ca(OH)_{2(aq)} + Na_2CO_{3(aq)} \rightarrow CaCO_{3(s)} + NaOH_{(aq)}$$

or the reactions:

$$2KOH_{(aq)} + CO_{2(aq)} \rightarrow K_2CO_{3(aq)} + H_2O_{(l)}$$

$$Ca(OH)_{2(aq)} + K_2CO_{3(aq)} \rightarrow CaCO_{3(s)} + KOH_{(aq)}$$

(where Ca can be replaced with Mg if present in the carbonate) or is suitable for controlling the flow of atmospheric air 510 so that the absorber/precipitator 50 has the adequate amount of $CO_2$ to react the amount of flow of alkaline substance 450; 470 fed to the absorber/precipitator 50 according to the reactions described above to optimize the production of a flow of PCC suspension 550.

A skilled person will certainly be able to understand that the size of the contactor 20 depends on the flow rates of the flow of carbonic gas 140, of the flow of water 210, of the flow of dosed PCC 920 and on the kinetics of the chemical reactions that take place. The ratios between the flow rates of the flow of carbonic gas 140, the flow of water 210 and the flow of dosed PCC 920 are established with physical-chemical criteria that allow the completion of the reactions:

$$CO_{2(aq)} + H_2O_{(l)} \rightleftharpoons H_2CO_{3(aq)} \rightleftharpoons H^+_{(aq)} + HCO_{3(aq)}^-$$

and $$CaCO_{3(s)} + CO_{2(aq)} + H_2O_{(l)} \rightarrow Ca(HCO_3)_{2(aq)}$$

(where Ca can be replaced with Mg if present in the carbonate) avoiding the precipitation of carbonates in the apparatus for pH correction 30 during the insertion of the flow of buffering substance 440; 460 due to too high $\Omega_{cal}$.

A skilled person will therefore be able to agree that the necessary contact time between the flow of water 210, the flow of carbonic gas 140 and possibly the flow of dosed PCC 920 is the main parameter that allows sizing the contactor 20. If for a contact time of 10 s, at a flow rate of the flow of carbonic gas 140 of 1 kg/s, it was needed 1 m³/s of flow of water 210, it means that the contactor 20 must have a size of about 10 m³; whereas if a flow rate of the flow of carbonic gas 140 was 10 kg/s, 10 m³/s of water would be needed and the size of the contactor would be about 100 m³.

In accordance with an embodiment of the plant 100, the amount of the flow of dosed PCC 920 introduced into the contactor 20 is null and the contactor 20 has a volume that allows a minimum contact time of the water with the flow of carbonic gas 140 of 10 s, preferably comprised between 60 s and 180 s and that allows to have a partial pressure of $CO_2$ greater than 0.1 bara, preferably comprised between 0.2 bara and 2 bara.

In a per se known form and in accordance with experimental results and with the scientific literature, the time for $CO_2$ to fully hydrate in water to form carbonic acid $H_2CO_3$ according to the reaction:

$$CO_{2(aq)} + H_2O_{(l)} \rightleftharpoons H_2CO_{3(aq)} \rightleftharpoons H^+_{(aq)} + HCO_{3(aq)}^-$$

has a characteristic time ranging from a few seconds to a few minutes.

Figure 5:
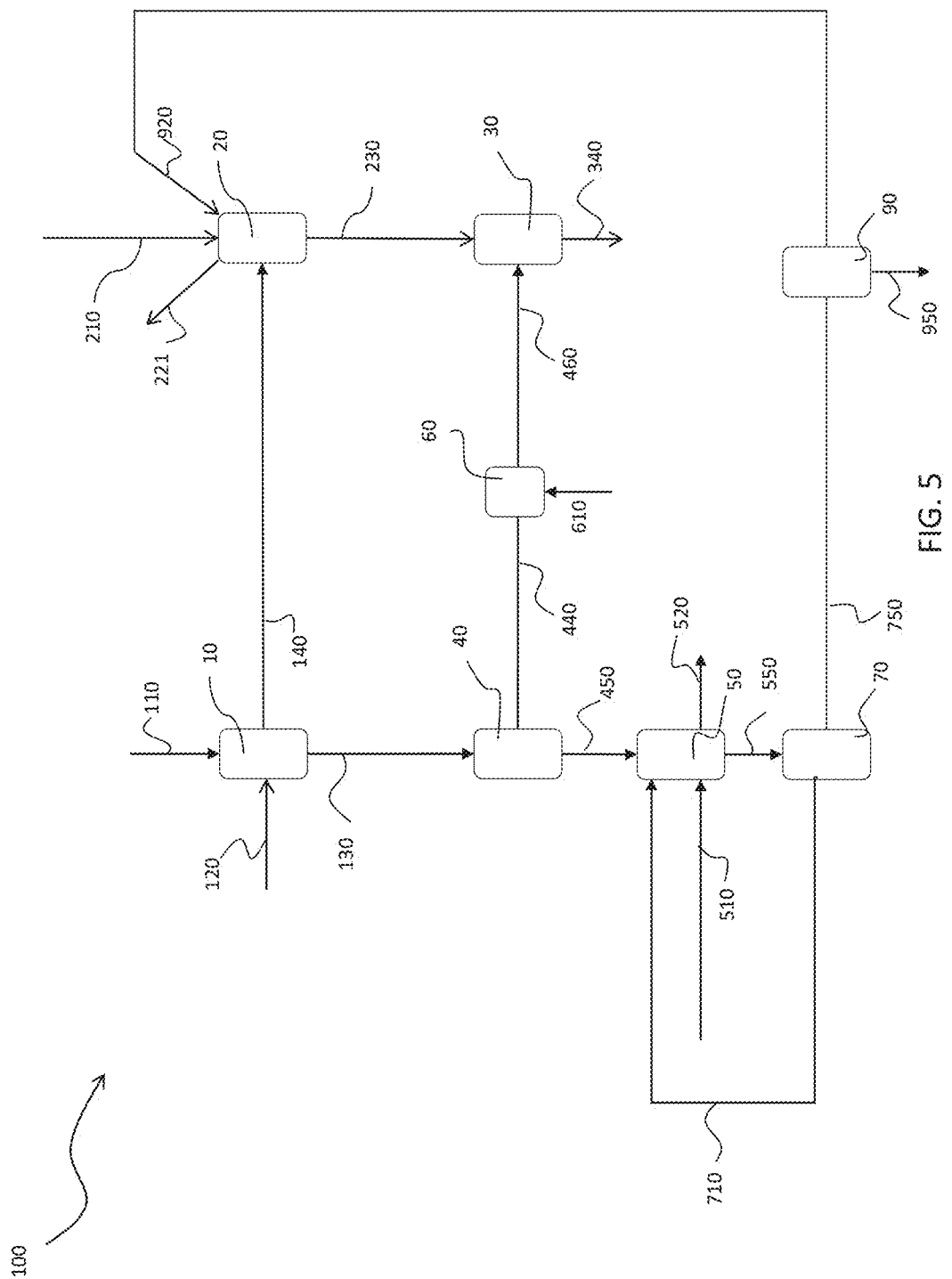
FIG. 5 is a schematic view of another possible embodiment of the plant to improve the efficiency of $CO_2$ capture and storage according to the invention.

It should be noted here that the buffering substance fed to the apparatus for pH correction 30, can be a flow of oxide (indicated with 440; FIGS. 1, 2, 3 and 6) or can be a flow of hydroxide (indicated with 460; FIGS. 4 and 5).

It should be noted here that the buffering substance fed to the dosing device for the buffering substance 40 can be both a flow of oxide (indicated with 130; FIGS. 1, 2, 3, 5 and 6) released by the electric calciner 10 and a flow of hydroxide (indicated with 630; FIG. 4) released by the hydroxide production unit 60, and that the buffering substance released by the dosing device for the buffering substance 40 can be both a flow of oxide (indicated with 440 and 450) and a flow of hydroxide (indicated with 460 and 470).

Figure 6:
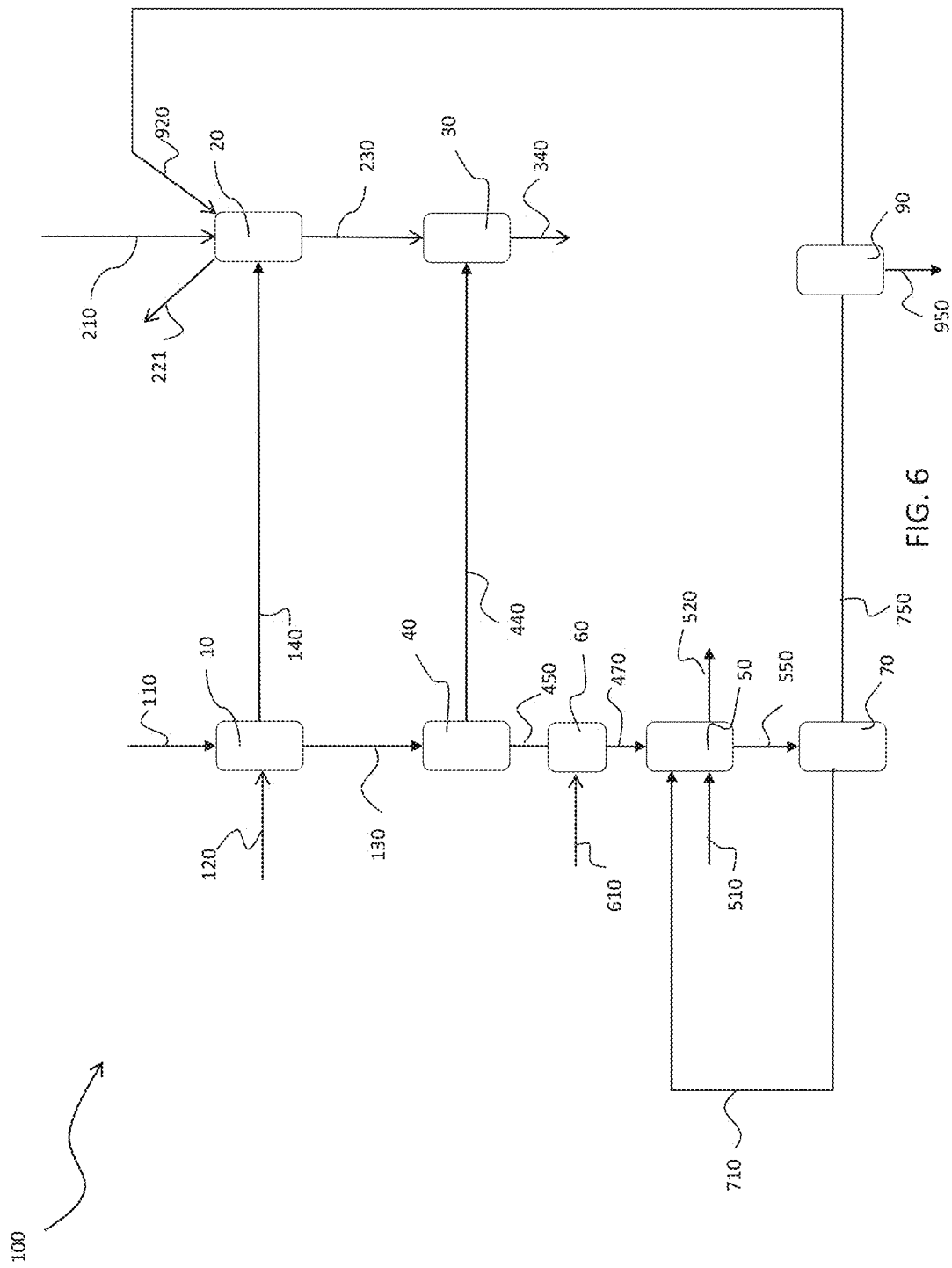
FIG. 6 is a schematic view of another possible embodiment of the plant to improve the efficiency of $CO_2$ capture and storage according to the invention.

It should be noted here that the buffering substance fed to the absorber/precipitator 50, can be a flow of oxide (indicated with 450; FIGS. 1, 2, 3 and 5) or can be a flow of hydroxide (indicated with 470; FIGS. 4 and 6).

A second aspect of the invention concerns a method to improve the efficiency of $CO_2$ capture and storage using precipitated calcium carbonate. The method according to the invention comprises the steps of:

providing an electric calciner 10;

feeding to the electric calciner 10 a flow of electric energy (120) and a flow of carbonate 110 to obtain the calcination of the flow of carbonate 110 according to the reaction:

$$CaCO_{3(s)} \rightarrow CaO_{(s)} + CO_{2(g)}$$

(where Ca can be replaced with Mg if present in the carbonate);

releasing at the outlet from the electric calciner 10 a flow of carbonic gas 140 and a flow of oxide 130;

providing the contactor 20;

conveying the flow of carbonic gas 140 to the contactor 20;

providing a dosing device for the buffering substance 40;

conveying the flow of oxide 130 or a flow of hydroxide 630 to the dosing device for the buffering substance 40;

from the dosing device for the buffering substance 40 obtaining a flow of buffering substance 440; 460 and a flow of alkaline substance 450; 470;

feeding to the contactor 20 the flow of carbonic gas 140 produced by the electric calciner 10, a predetermined flow of water 210 and a flow of dosed PCC 920 to obtain a flow of ionic mixture 230 via reactions:

$$CO_{2(aq)} + H_2O_{(l)} \rightleftharpoons H_2CO_{3(aq)} \rightleftharpoons H^+_{(aq)} + HCO_{3(aq)}^-$$

e $$CaCO_{3(s)} + CO_{2(aq)} + H_2O_{(l)} \rightarrow Ca(HCO_3)_{2(aq)}$$

(where Ca can be replaced with Mg if present in the carbonate)

releasing at the outlet from the contactor 20 the flow of ionic mixture 230;

conveying the flow of ionic mixture 230;

conveying the flow of buffering substance 440; 460;

providing an apparatus for pH correction 30;

feeding the apparatus for pH correction 30 with the flow of ionic mixture 230 and with the predetermined flow of buffering substance 440; 460;

releasing at the outlet of the apparatus for pH correction 30 a flow of buffered ionic mixture 340;

providing an absorber/precipitator 50;

feeding the flow of alkaline substance 450; 470 to the absorber/precipitator 50;

feeding a flow of atmospheric air 510 to the absorber/precipitator 50 so that the reaction of the $CO_2$ present in it can take place with the flow of alkaline substance 450; 470 following the reactions:

$$2NaOH_{(aq)}+CO_{2(aq)} \rightarrow Na_2CO_{3(aq)}+H_2O_{(l)}$$

$$Ca(OH)_{2(aq)}+Na_2CO_{3(aq)} \rightarrow CaCO_{3(s)}+NaOH_{(aq)}$$

or the reactions:

$$2KOH_{(aq)}+CO_{2(aq)} \rightarrow K_2CO_{3(aq)}+H_2O_{(l)}$$

$$Ca(OH)_{2(aq)}+K_2CO_{3(aq)} \rightarrow CaCO_{3(s)}+KOH_{(aq)}$$

(where Ca can be replaced with Mg if present in the carbonate);

releasing at the outlet from the absorber/precipitator 50 a flow of PCC suspension 550 and a flow of lean air 520;

providing a separator 70;

feeding the flow of PCC suspension 550 to the separator 70 so that a flow of PCC 750 can be separated from a flow of basic solution 710;

providing a PCC dosing device 90;

feeding the flow of PCC 750 to the PCC dosing device 90;

releasing at the outlet from the PCC dosing device 90 the predetermined flow of dosed PCC 920 and a predetermined flow of excess PCC 950;

feeding the predetermined flow of dosed PCC 920 to the contactor 20 so that the reaction can take place:

$$CaCO_3+CO_2+H_2O \rightarrow Ca(HCO_3)_2$$

(where Ca can be replaced with Mg if present in the carbonate);

making available the predetermined flow of excess PCC 950.

In accordance with some embodiments of the invention, the flow of buffering substance fed to the apparatus for pH correction 30 is a flow of oxide 440.

In accordance with some embodiments of the invention, the flow of buffering substance fed to the absorber/precipitator 50 is a flow of oxide 450.

In accordance with some embodiments of the invention, the method further comprises the steps of:

providing a hydroxide production unit 60;

feeding the flow of oxide 130; 440 and a predetermined flow of water 610 to the hydroxide production unit 60 so that the reaction can take place:

$$CaO_{(s)}+H_2O_{(l)} \rightarrow Ca(OH)_{2(s)}$$

(where Ca can be replaced with Mg if present in the carbonate);

releasing at the outlet from the hydroxide production unit 60 at least a flow of hydroxide 630; 470.

In accordance with such embodiments of the method, the flow of buffering substance fed to the apparatus for pH correction 30 can be a flow of hydroxide 460.

In accordance with such embodiments of the method, the flow of alkaline substance feeding the absorber/precipitator 50 can be a flow of hydroxide 470.

In accordance with some embodiments of the invention, the method further comprises the step of:

recirculating the flow of basic solution 710 released by the separator 70 to the absorber/precipitator 50.

In accordance with some embodiments of the invention, the method further comprises the steps of:

providing a control unit 80 and a process parameters meter 81 for the flow of ionic mixture 230 or for the buffered ionic mixture 340;

providing the measurement of the process parameters meter 81 to the control unit 80;

controlling the dosing device for the buffering substance 40 by means of the control unit 80 so that it feeds to the apparatus for pH correction 30 the exact amount of flow of buffering substance 440; 460 to obtain a buffered ionic mixture 340 with a desired pH.

In accordance with some embodiments of the invention, the method further comprises the steps of:

providing a control unit 82 and one or more process parameters meters 83; 84 for the flow of atmospheric air 510 and/or for the flow of lean air 520;

providing the measurement of the process parameters meters 83; 84 to the control unit 82;

controlling the dosing device for the buffering substance 40 by means of the control unit 82 so that it feeds to the absorber/precipitator 50 the amount of the flow of alkaline substance 450; 470 that is adequate to optimize the production of a flow of PCC suspension 550 respectively according to the reactions:

$$2NaOH_{(aq)}+CO_{2(aq)} \rightarrow Na_2CO_{3(aq)}+H_2O_{(l)}$$

$$Ca(OH)_{2(aq)}+Na_2CO_{3(aq)} \rightarrow CaCO_{3(s)}+NaOH_{(aq)}$$

or the reactions:

$$2KOH_{(aq)}+CO_{2(aq)} \rightarrow K_2CO_{3(aq)}+H_2O_{(l)}$$

$$Ca(OH)_{2(aq)}+K_2CO_{3(aq)} \rightarrow CaCO_{3(s)}+KOH_{(aq)}$$

(where Ca can be replaced with Mg if present in the carbonate)

controlling the flow of atmospheric air 510 so that the absorber/precipitator 50 has the adequate amount of $CO_2$ to react the amount of flow of alkaline substance 450; 470 fed to the absorber/precipitator 50 according to the reactions described above to optimize the production of a flow of PCC suspension 550.

In accordance with some embodiments of the invention, the method further comprises the steps of:

providing a control unit 85 and one or more process parameters meters 86; 87 a flow of water 210 entering the contactor 20 and/or for the flow of ionic mixture 230 and of the buffered ionic mixture 340;

providing the measurement of the process parameters meters 86; 87 to the control unit 85;

controlling the PCC dosing device 90 and the dosing device for the buffering substance 40 by means of the control unit 85 so that it feeds the contactor 20 respectively with the correct amount of the flow of dosed PCC 920.

With reference to FIGS. 1, 2, 3, 4, 5, 6 a skilled person will be able to see that the electric calciner 10 is fed with the flow of carbonate 110 and a flow of electric energy 120 and releases a flow of oxide 130 and the flow of carbonic gas 140. The electric calciner 10 is fed by electric energy to generate the heat necessary for calcination. The electric energy can be used in electrical resistors, microwave generators, plasma torches or induction systems.

In a per se known form, the calcination of the flow of carbonate 110 takes place according to the reaction:

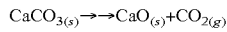

(where Ca can be replaced with Mg if present in the carbonate), at temperatures comprised between about 600° C. (MgCO$_3$) and 1200° C. (CaCO$_3$) and at intermediate values as a function of the chemical composition of the carbonate which can also be a CaMg(CO$_3$)$_2$ dolomite and of the chemical composition of the atmosphere in the calciner.

In a per se known form, the calcination reaction is an endothermic reaction requiring 118 KJ/mol of heat in the case of calcination of MgCO$_3$ and 183 KJ/mol in the case of CaCO$_3$.

A skilled person can understand that the CO$_2$ produced by a controlled-atmosphere electric calcination generates a flow of carbonic gas 140 formed by CO$_2$ and traces of non-soluble gases 221 possibly entered with the flow of carbonate 110 inside the electric calciner 10 or gases intentionally fed to the electric calciner 10 to improve the process conditions.

With reference to the embodiment of FIGS. 1, 2, 3, 4, 5, 6, the plant 100 according to the invention comprises the contactor 20.

In a per se known form, the contactor 20 uses a flow of water 210 and a flow of dosed PCC 920 as a medium to absorb CO$_2$ from the flow of carbonic gas 140 and to form the flow of ionic mixture 230 according to the reaction:

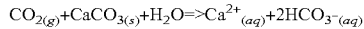

where the Ca can be replaced by Mg if present in the flow of dosed PCC 920.

In a per se known form, there are different types of contactors (limestone contactors or calcite contactors), generally used for the re-mineralization of drinking water downstream of desalination treatments.

In a per se known form, the permanent storage of CO$_2$ in the form of bicarbonates in the sea using contactors has been proposed in several scientific articles and patents, among which it is worth mentioning the U.S. Pat. No. 6,890,497 B2 entitled "Method for extracting and sequestering carbon dioxide" and the Italian patent application 102020000000037 entitled "Impianto e metodo per il sequestro di CO$_2$ con un condotto reattore a pressione crescente" ("Plant and method for sequestering CO$_2$ with a growing pressure reactor conduit").

In a per se known form, the contactors used for the re-mineralization of water or whose use has been proposed for the permanent storage of CO$_2$ in the form of bicarbonates must keep the water that is in contact with the carbonate sufficiently under-saturated, with an $\Omega_{cal}$ preferably comprised between 0.01 and 0.6, to allow a dissolution kinetics of the carbonate that is sufficiently rapid and acceptable for an industrial plant. For this reason, the commercial contactors use an excess of CO$_2$ in the water, a pH generally comprised between 5 and 6, and a final degassing of the CO$_2$ to bring the pH of the water back to values above 7.

In a per se known form, the technologies for CO$_2$ storage by means of bicarbonates in the sea have, as mentioned above, the discharge of an acid effluent (pH comprised between 6 and 7), with still a significant amount of CO$_2$ not reacted with the carbonate. This fact turns out to be environmentally harmful if the discharge of the effluent takes place in the depths of the sea where there is no possibility of degassing the CO$_2$ or it is very inefficient (CO$_2$ storage efficiencies of about 50%) where the discharge takes place on the surface with degassing of the residual CO$_2$.

A skilled person will understand that by neutralizing such acidity present in the flow of ionic mixture 230 with a flow of buffering substance 440 or 460, one could discharge into the sea an effluent with the same natural pH as the seawater and store all the residual CO$_2$ in the form of bicarbonates according to the reaction:

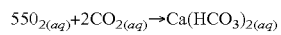

(where Ca can be replaced with Mg if present in the carbonate). The neutralization of this acidity eliminates the environmental issues and achieves a CO$_2$ storage efficiency of about 100%.

In a per se known form, the reaction of Ca(OH)$_2$ (where Ca can be replaced by Mg if present in the carbonate) with seawater is a complex reaction because of the presence of other chemical elements and therefore it turns out that for each mole of Ca(OH)$_2$ one can neutralize about 1.50-1.79 moles of CO$_2$ instead of the 2 moles provided for by the equation:

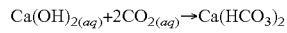

(where Ca can be replaced with Mg if present in the carbonate)

With reference to the embodiment of FIGS. 1, 2, 3, 4, 5 and 6, the plant 100 according to the invention comprises the apparatus for pH correction 30 wherein the flow of ionic mixture 230 is mixed with a predetermined amount of flow of buffering substance 440 or 460 sufficient to obtain the desired pH of the buffered ionic mixture 340.

A skilled person can easily understand that the composition of the flow of ionic mixture 230 released by the contactor 20 may contain impurities that are convenient to be filtered from the flow of ionic mixture 230 by means of appropriate filters (not shown in the figure) placed between the mixer 20 and the apparatus for pH correction 30 or downstream of the apparatus for pH correction 30.

With reference to the embodiment of FIG. 2, the plant 100 according to the invention is provided with a process parameters meter 81 and with a control unit 80 for the management of the dosing device for the buffering substance 40 that allows to feed to the apparatus for the correction of the pH 30 the correct amount of flow of oxide 440 or hydroxide 460. In the case of the flow of hydroxide 460, the dosing device for the buffering substance 40 may be a dosing pump as the flow of hydroxide 460 may be fed to the apparatus for pH correction 30 in the form of a slurry or of ionic solution.

A skilled person will certainly be able to agree that the maximum amount of CO$_2$ captured and stored from a flow of atmospheric air 510 in the absorber/precipitator 50 is the greater, the greater the amount of carbonate of the flow of dosed PCC 920 dissolved in the contactor 20 is as the amount of the flow of buffering substance 440; 460 necessary to feed the apparatus for pH correction 30 is smaller. Consequently, the amount of the flow of alkaline substance 450; 470 available to the absorber/precipitator 50 will be greater.

A skilled person will certainly be able to understand that in order to maximize the amount of CO$_2$ captured from a flow of atmospheric air 510 it is necessary to maximize the amount of the flow of dosed PCC 920 dissolved in the contactor 20.

Figure 7:
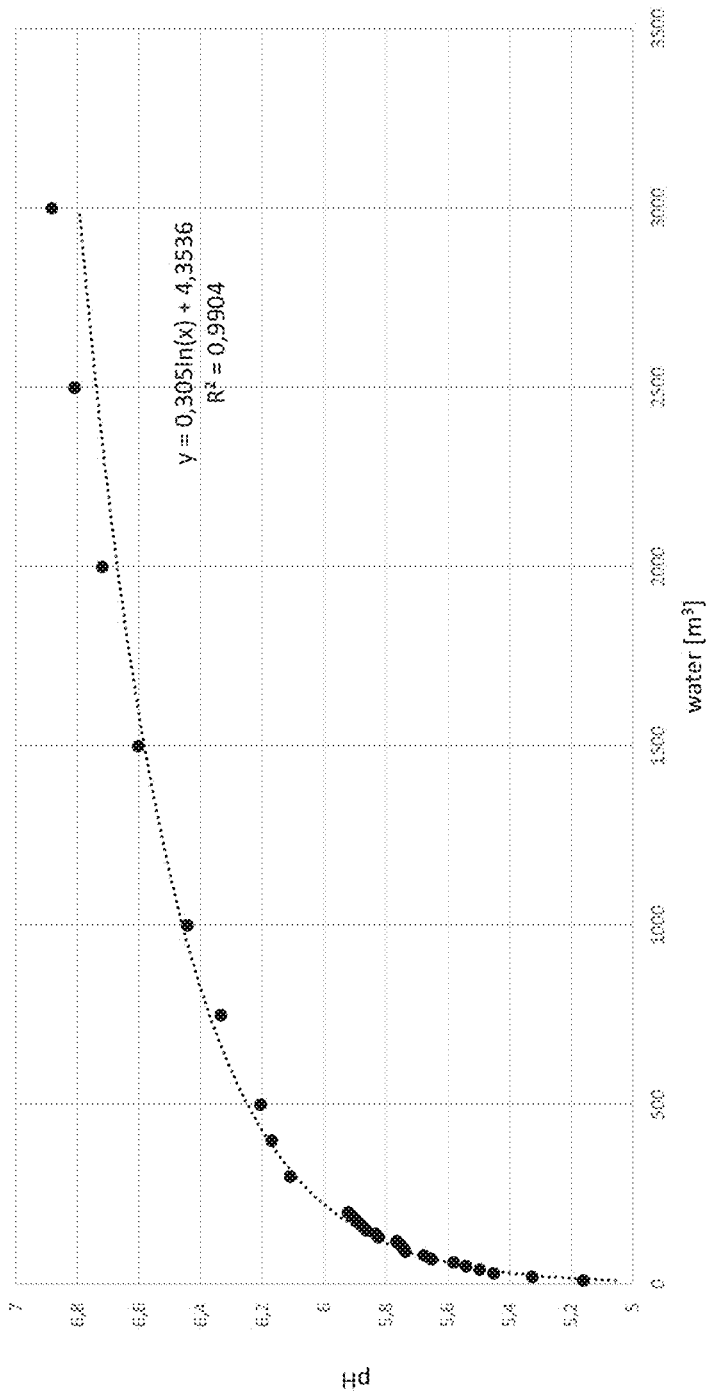
FIG. 7 is a graph of the equilibrium of 2270 kg of calcite and 1000 kg of $CO_2$ in seawater as a function of the pH and of the amount of water.

In a per se known form, the dissolution of the flow of dosed PCC 920 in the contactor 20 depends on the amount of water and on the pH according to the equilibrium curve presented in FIG. 7 which refers to the complete dissolution of 2270 kg of CaCO$_3$ in seawater in the presence of 1000 kg of CO$_2$.

A skilled person will certainly be able to calculate, with the information available in the literature, the dissolution rate of the carbonate as a function of the amount of water and of the pH, the sizes of the contactor 20 and the sizes and specific surface of the carbonate crystals that make up the flow of dosed PCC 920.

A skilled person will certainly be able to agree that the dissolution rate of the carbonate increases proportionally to the increase in the surface of the carbonate particles and that therefore the use, with the same mass, of small-sized carbonate particles with a high area/volume ratio increases the surface where the dissolution reactions take place and hence the dissolution rate compared to the use of large-sized particles.

A skilled person will certainly be able to verify that the contact times between the flow of water 210 and the carbonate inside the contactor 20 necessary for a complete dissolution of the carbonate depend on the sizes of the carbonate itself and on the ratio between the amounts of $CO_2$ present in the flow of carbonic gas 140 and the amount of the flow of water 210.

A skilled person will certainly be able to verify that by using a ratio between the mass flow of the flow of water 210 and $CO_2$ present in the flow of carbonic gas 140 of less than 2000:1, and a carbonate particle of less than 1 micron, the minimum contact time between the flow of water 210 and the carbonate inside the contactor 20 that are necessary to have a residual amount of $CO_2$ in the flow of ionic mixture 230 of about 50% are less than 1,000 s while for a particle greater than 10 microns, the minimum contact time between the flow of water 210 and the carbonate inside the contactor 20 necessary to have a residual amount of $CO_2$ in the flow of ionic mixture 230 of about 50% are higher than 50,000 s.

A skilled person will therefore certainly understand that, in order to contain the sizes and the costs of the contactor 20, it is convenient to use small-sized carbonate particles, smaller than 5 microns and preferably comprised between 0.1 and 1 micron and to leave a residual amount of $CO_2$ in the flow of ionic mixture 230 higher than 50%.

A skilled person will therefore certainly understand that, with the same size of the contactor 20, it is possible to dissolve more carbonate if the particle is smaller than 1 micron compared to the case in which it is greater than 10 microns.

A skilled person will certainly understand the advantage of using in the contactor 20 the micron or submicron-sized carbonate crystals obtained from a PCC precipitation process in the absorber/precipitator 50 instead of particles of carbonate ground by mechanical processes.

A skilled person will certainly be able to agree that the micron-sized carbonate grinding process involves considerable investments in machinery which, in addition to considerable energy consumptions, entails high maintenance costs.

In a per se known form and with reference to the scientific article by Rinder et al (2021)—"The influence of particle size on the potential of enhanced basalt weathering for carbon dioxide removal-Insights from a regional assessment. Journal of Cleaner Production", the energy consumption for the grinding of carbonate up to the size of 1 micron is about 560 Kwh/ton while, as will be explained later, the energy consumption for the production of 1 ton of PCC produced using an industrial flow of atmospheric air 510 with 14 molar % of $CO_2$ is about 100 Kwh/ton.

A skilled person will certainly be able to agree that, having available a flow of alkaline substance 450; 470, an absorber/precipitator 50, a separator 70 and a flow of atmospheric air 510 according to the invention, the production of precipitated carbonate crystals such as the flow of dosed PCC 920 with micron or submicron sizes is more energetically convenient and from a plant point of view easier than installing a mechanical grinding plant.

In a per se known form and as already anticipated above, the dissolution rate of the carbonate decreases asymptotically to zero as equilibrium conditions are approached and therefore, in order to maintain the sizes of the contactor 20 within commercially acceptable limits, it is necessary to maintain process conditions away from the equilibrium. Consequently, it is reasonable to use in the contactor 20 a pH of the water preferably comprised between 5 and 6.5, which corresponds to a residual $CO_2$ higher than 50% of the $CO_2$ initially present in the carbonic gas 140 in the ionic mixture 230 with amount of water 210 from 500 $m^3/ton_{CO2}$ to 4000 $m^3/ton_{CO2}$.

A skilled person can certainly understand that the flow of ionic mixture 230 released by the contactor 20, if not subjected to a $CO_2$ degassing with loss of storage efficiency, generally has a pH comprised between 5 and 6.5, lower than the pH of the sea which is about pH 8.

A skilled person will certainly understand that, in order to avoid acidifying the sea by releasing a flow of acidic ionic mixture 230, it is necessary to buffer the pH with a basic substance such as a flow of oxide 440 or of hydroxide 460.

A skilled person will then understand that the chemical reactions that take place in the apparatus for pH correction 30 are fundamental for the storage in the form of calcium bicarbonates of the residual $CO_2$ in the ionic mixture 230 and are not a trivial addition of alkaline substance for a small pH correction.

A skilled person will easily be able to verify that with the same mass ratio between the flow of water 210 and the $CO_2$ present in the flow of carbonic gas 140 and by decreasing the quantities of the flow of dosed PCC 920 used in the contactor 20 according to the invention, the necessary contact time between the flow of water 210, the $CO_2$ and the flow of dosed PCC 920, progressively decreases up to reaching a few seconds necessary only for the hydration of the $CO_2$ in the particular case in which the flow of dosed PCC 920 used is null. A skilled person will certainly understand that the choice of the contact time between the flow of water 210, the $CO_2$ present in the flow of carbonic gas 140 and the flow of dosed PCC 920 or the choice of not using the flow of dosed PCC 920 to buffer the $CO_2$ present in the carbonic gas 140 but only the flow of buffering substance 440 or 460 are choices of economical type. In fact, by decreasing the amount of the flow of dosed PCC 920 used with the same $CO_2$ present in the flow of carbonic gas 140 and the flow of water 210, the sizes and the plant cost of the contactor 20 are decreased to the detriment of a greater consumption of electric energy necessary to produce greater amounts of flow of oxide 440 or hydroxide 460 that are necessary to buffer the $CO_2$ present in the flow of ionic mixture 230 but with greater amounts of flow of excess PCC 950 available for sale and smaller amounts of $CO_2$, present in the flow of lean air 520, captured and stored.

Figure 8:
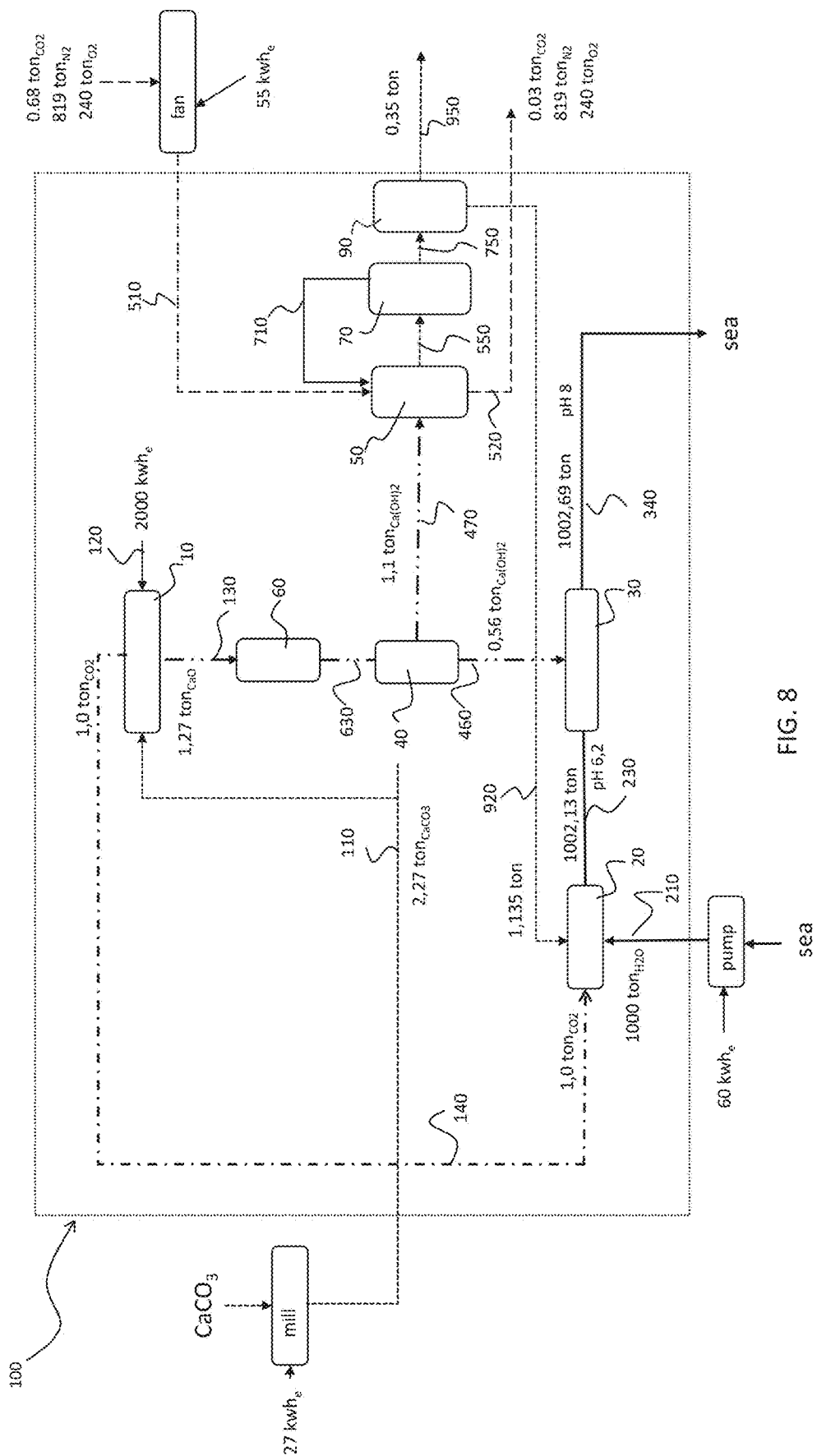
FIG. 8 is a mass and energy balance of a possible embodiment of the plant to improve the efficiency of $CO_2$ capture and storage according to the invention.

With reference to FIG. 8, a skilled person can certainly understand the simplified mass and energy balance of a particular plant 100 for $CO_2$ capture and storage by PCC production according to the invention wherein:

the electric calciner 10 is fed by 2,270 kg of flow of carbonate 110 ($CaCO_3$) and 2,000 $kw_e$ of a flow of electric energy 120 and releases at the outlet 1,000 kg of flow of carbonic gas 140 ($CO_2$) and 1,271 kg of flow of oxide 130 (CaO);

the contactor 20 is fed by 1,000 m³ of flow of water 210 (considered with a density of 1 kg/dm³), by 1,135 kg of flow of dosed PCC 920 and 1,000 kg of flow of carbonic gas 140 ($CO_2$) and releases, at the outlet, after a residence time of 600 s at an average pressure of 2 bara, 1,002,135 kg of flow of ionic mixture 230 in which there are still present 500 kg of $CO_2$ and a pH of about 6.2;

the hydroxide production unit 60 is fed by 1,271 kg of flow of oxide 130 released by the electric calciner 10 and by a predetermined flow of water (not shown) and releases at the outlet 1,680 kg of flow of hydroxide 630 $Ca(OH)_2$;

the dosing device for the buffering substance 40 receives at the inlet 1,680 kg of flow of hydroxide 630 released by the hydroxide production unit 60 and releases at the outlet 560 kg of flow of hydroxide 460 to the apparatus for pH correction 30 and 1,100 kg of flow of hydroxide 470 available for feeding the absorber/precipitator 50;

the apparatus for pH correction 30 receives at the inlet 1,002,130 kg of flow of ionic mixture 230 released by the contactor 20 and 560 kg of flow of hydroxide 460 released by the dosing device for the buffering substance 40 and releases 1,002,690 kg of buffered ionic mixture 340 with pH of 8 exploiting the reaction:

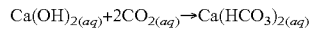

$$Ca(OH)_{2(aq)} + 2CO_{2(aq)} \rightarrow Ca(HCO_3)_{2(aq)}$$

(where Ca can be replaced with Mg if present in the carbonate). In the case of seawater, as a function of its chemical composition, 1 mole of $Ca(OH)_2$ neutralizes 1.50-1.79 moles of $CO_2$. In the case under examination, a ratio of 1.5 moles of $CO_2$ per mole of $Ca(OH)_2$ is considered;

the absorber/precipitator 50 receives at the inlet 1,100 kg of flow of hydroxide 470 and 1,059,680 kg of a flow of atmospheric air 510 containing 0.0412 mol % of $CO_2$, 146,523 kg of basic solution 710 and releases at the outlet 1,059,003 kg of flow of lean air 520 and 148,000 kg of a flow of PCC suspension 550;

the separator 70 receives at the inlet 148,000 kg of flow of PCC suspension 550 and releases at the outlet 1,477 kg of flow of PCC 750; and the PCC doser 90 receives at the inlet 1,477 kg of flow of PCC 750 and releases at the outlet 1,100 kg of flow of dosed PCC 920 to feed the contactor 20 and 377 kg of commercially available flow of excess PCC 950.

Still with reference to FIG. 8, a skilled person can certainly calculate the energy necessary for the ventilation of the flow of atmospheric air 510 from 1 bara to 2 bara (pressure necessary to generate bubbles in a 10-meter-high bubble absorber/precipitator) which, for the case in question is 55 $kWh_e$.

Still with reference to FIG. 8, a skilled person will be able to calculate the energy necessary for the recirculation of the flow of basic solution 710 between the absorber/precipitator 50 and the separator 70 which, in the particular case, turns out to be 35 $kWh_e$.

Still with reference to FIG. 8, a skilled person will be able to calculate the energy necessary for pumping the flow of water 210 which, in the particular case, turns out to be 60 $kWh_e$.

Still with reference to FIG. 8, a skilled person will be able to notice that the total electrical consumption (compression of the flow of atmospheric air 510, water pumping between the separator 70 and the absorber/precipitator 50 and possibly other minor consumptions not shown in the drawing) to produce 1,135 kg of flow of dosed PCC 920 and 350 kg of excess PCC flow 950 with a size of 1 micron amount to about 100 $kWh_e$ whilst, as written above, if one had to grind the carbonate to the size of 1 micron, one would have an electrical consumption of 635 $kWh_e$.

As a skilled person can understand, using the flow of dosed PCC 920 instead of mechanically micronized carbonate for capturing and storing $CO_2$ present in the flow of atmospheric air 510 entails a considerable increase in energy efficiency of the plant according to the invention.

Still with reference to FIG. 8, a skilled person can well understand that there may also be the production of a certain amount of flow of excess PCC 950 usable for other uses as a function of the process parameters used in the contactor 20 and hence of the amount of the flow of dosed PCC 920 used.

A skilled person may understand that in the plant according to the invention it is possible to maximise the capture and storage of the $CO_2$ present in the flow of atmospheric air 510 in the absorber/precipitator 50 by sending all the flow of PCC suspension 550 produced in the absorber/precipitator 50 to the contactor 20 as a flow of dosed PCC 920. Conversely, it is possible to maximize the production of a flow of excess PCC 950 by bringing to zero the amount of the flow of dosed PCC 920 sent to the contactor 20.

As a skilled person can well understand from the above reported example, the flow of excess PCC 950 available for other uses is a completely decarbonized PCC in case the flow of electric energy 120 feeding the calciner and the electric energy (not shown in the example) feeding the extraction, the transport and the crushing of the carbonate and the pumping of the water were completely renewable; conversely, the flow of excess PCC 950 would be decarbonized except for the share that is part of the emissions due to the energy contribution mentioned above.

As a skilled person can understand, the flow of excess PCC 950, can be conveniently used in various industrial sectors such as those of paper, plastics, rubber and food for both human and animal consumption.

A skilled person can certainly understand that the plant according to the invention allows to directly capture the atmospheric $CO_2$ by storing it in calcium carbonate and generating negative emissions.

As the skilled person can well calculate using market values, the cost per ton of decarbonized PCC depends mainly on the cost of the carbonate and of the electric energy while the plant and labour costs have a marginal impact on the final result. In particular, about 2100 $kWh_e$ of electric energy and 2270 kg of carbonate are needed to produce 1 ton of decarbonized PCC. If the cost of carbonate were 7.5 €/ton and the cost of renewable electric energy were 30 €/MWh (it is the LCOE—Levelized Cost Of Energy of wind energy), the variable cost of the flow of PCC 750, in the case analysed in FIG. 8, would be 225 €/$ton_{PCC}$ from which one should subtract the benefit obtained from the capture and storage of quantifiable 1.95 tons of $CO_2$ present in the flow of atmospheric air 510, at 80 €/$ton_{CO2}$, in 156 €/ton, resulting in a final variable cost of about 69 €/$ton_{PCC}$.

A skilled person, again for the case analysed in FIG. 8, could therefore calculate that the installation costs of the electric calciner, the contactor, the dosing device, the carbonate mill, the civil works and the services have an impact of about €15/ton on the flow of excess PCC 950, while personnel costs turn out to be negligible.

Still with reference to FIG. 8, a skilled person will then be able to calculate that the final cost of a ton of flow of excess PCC 950 is €84/$ton_{CO2}$. Considering that a ton of flow of excess PCC 950 can be sold on the market at values higher than 300 €/$ton_{PCC}$, the plant according to the invention allows to have an economic margin equal to or greater than about 200 €/ton$_{PCC}$ which corresponds to a margin of about 100 €/ton$_{CO2}$ captured and sequestered in the flow of atmospheric air 510.

As a skilled person can understand, the plant according to the invention allows to generate revenues from the capture and permanent storage of $CO_2$ present in a flow of atmospheric air 510, being much more competitive than the plants of $CO_2$ capture and storage present on the market that consider $CO_2$ capture and storage as a cost.

As a skilled person can certainly understand, the process for capturing and storing the $CO_2$ present in a flow of atmospheric air 510 according to the invention allows to permanently store $CO_2$ both in the sea in the form of bicarbonates and in the form of carbonates at a cost that is competitive with the cost of geological CCS.

As a person will certainly be able to understand, the availability of carbonate, water and renewable electric energy are not limitations to produce enough decarbonized PCC according to the invention to permanently store all the anthropogenic $CO_2$ and to generate the negative $CO_2$ emissions necessary to comply with the 2015 Paris agreements.

As the skilled person can well conclude, the method and the plant according to the invention allow to produce decarbonized PCC using exhaust gases of industrial plants or atmospheric air contributing to the decarbonization of industrial sectors where it is difficult to reduce $CO_2$ and to generate negative emissions.

It is clear that the specific characteristics are described in relation to different embodiments of the plant and of the method by way of non-limiting example. Obviously, in order to satisfy contingent and specific needs, a person skilled in the art may make numerous modifications and variants to the plant and method according to the present invention, all nevertheless contained within the scope of protection, as defined by the following claims.

The invention claimed is:

1. A plant to improve the efficiency of $CO_2$ capture and storage using precipitated calcium carbonate PCC, the plant comprising: an electric calciner, a contactor, an apparatus for pH correction, a dosing device for the buffering substance, an absorber/precipitator, a separator, and a PCC dosing device, wherein:
   the electric calciner is configured for receiving at the inlet a flow of carbonate, a flow of electric energy and for releasing at the outlet at least a flow of carbonic gas and at least a flow of oxide;
   the flow of oxide is configured for providing a flow of buffering substance, and a flow of alkaline substance;
   the contactor is configured for receiving at the inlet the flow of carbonic gas released by the electric calciner, a flow of dosed PCC and a flow of water;
   the contactor is further configured for reacting the $CO_2$ present in the flow of carbonic gas with the flow of water and the flow of dosed PCC coming from the PCC dosing device according to the reactions:

$CO_{2(aq)} + H_2O_{(l)} \rightleftharpoons H_2CO_{3(aq)} \rightleftharpoons H^+_{(aq)} + HCO_{3(aq)}^-$ and

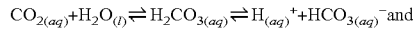

$CaCO_{3(s)} + CO_{2(aq)} + H_2O \rightarrow Ca(HCO_3)_{2(aq)}$ and for releasing at the outlet at least a flow of ionic mixture and a flow of non-soluble gases;
   the apparatus for pH correction is configured for receiving at the inlet at least a flow of buffering substance and the flow of ionic mixture;

the apparatus for pH correction is configured for reacting the flow of ionic mixture with the flow of buffering substance and for releasing at the outlet a flow of buffered ionic mixture;
   the dosing device for the buffering substance is configured for receiving at the inlet a flow of buffering substance or a flow of hydroxide and for releasing at the outlet the predetermined flow of buffering substance to feed the apparatus for pH correction and the flow of alkaline substance to feed the absorber/precipitator;
   the absorber/precipitator is configured for receiving at the inlet the flow of alkaline substance released by the dosing device for the buffering substance, a flow of atmospheric air, a flow of basic solution and for releasing a flow of lean atmospheric air and a flow of PCC suspension to feed the separator;
   the separator is configured for receiving at the inlet the flow of PCC suspension and for releasing at the outlet at least a flow of PCC available to the PCC dosing device and the flow of basic solution;
   the PCC dosing device is configured for receiving at the inlet the flow of PCC and for releasing:
      a flow of dosed PCC available to feed the contactor;
      the flow of excess PCC available for any use;
   and wherein the basic solution is an aqueous solution comprising one or more of: NaOH, $Na_2CO_3$, KOH, and $K_2CO_3$.

2. The plant according to claim 1, wherein the flow of buffering substance and the flow of alkaline substance are flows of oxide originating from the electric calciner and the apparatus for pH correction is suitable for reacting the flow of ionic mixture with the flow of oxide according to the reaction:

$CaO_{(s)} + H_2O_{(l)} + 2CO_{2(aq)} \rightarrow Ca(HCO_3)_{2(aq)}$ and the absorber/precipitator is suitable for reacting the flow of atmospheric air with the flow of oxide.

3. The plant according to claim 1, further comprising a hydroxide production unit installed between the electric calciner and the apparatus for pH correction, wherein:
   the hydroxide production unit is configured for receiving at the inlet at least the flow of oxide originating from the electric calciner and a predetermined flow of water; and
   the hydroxide production unit is configured for reacting the flow of oxide with the flow of water according to the reaction:

$CaO_{(s)} + H_2O_{(l)} \rightarrow Ca(OH)_{2(s)}$ and for releasing at the outlet the flow of hydroxide;
   the apparatus for pH correction is configured for reacting the flow of ionic mixture with the flow of hydroxide according to the reaction:

$Ca(OH)_{2(aq)} + 2CO_{2(aq)} \rightarrow Ca(HCO_3)_{2(aq)}.$

4. The plant according to claim 1, further comprising a hydroxide production unit installed between the dosing device for the buffering substance and the absorber/precipitator, wherein:
   the hydroxide production unit is configured for receiving at the inlet at least a flow of oxide originating from the electric calciner and the predetermined flow of water; and
   the hydroxide production unit is configured for reacting the flow of oxide with the flow of water according to the reaction:

$CaO_{(s)} + H_2O_{(l)} \rightarrow Ca(OH)_{2(s)}$ and for releasing at the outlet a flow of hydroxide.

5. The plant according to claim 1, further comprising a control unit and a process parameters meter for the flow of ionic mixture or for the buffered ionic mixture; the process parameters meter is also configured for providing the measurement to the control unit, and the control unit is configured for controlling the dosing device for the buffering substance so that it feeds to the apparatus for pH correction the exact amount of flow of buffering substance that is adequate to obtain the buffered ionic mixture with the desired pH.

6. The plant according to claim 1, further comprising a control unit, one or more process parameters meters for the flow of water entering the contactor, one or more process parameters meters for the flow of ionic mixture leaving the contactor; the process parameters meters are further configured for providing the measurements to the control unit and the control unit is configured for controlling the PCC dosing device so that it feeds to the contactor the amount of flow of dosed PCC that is adequate to obtain the flow of ionic mixture with the desired pH.

7. The plant according to claim 1, further comprising a control unit and one or more process parameters meters for the physical/chemical parameters of the flow of atmospheric air and/or for the flow of lean atmospheric air suitable for measuring the $CO_2$ flow rate and/or concentration, and meters of the physical/chemical parameters of the flow of atmospheric air and/or of the flow of lean atmospheric air are also configured for providing the measurement to the control unit which is configured for controlling the dosing device for the buffering substance so that it feeds to the absorber/precipitator the exact amount of flow of alkaline substance that is adequate to optimize the production of a flow of PCC suspension respectively according to the reactions:

$$2NaOH_{(aq)}+CO_{2(aq)} \rightarrow Na_2CO_{3(aq)}+H_2O_{(l)}$$

$$Ca(OH)_{2(aq)}+Na_2CO_{3(aq)} \rightarrow CaCO_{3(s)}+NaOH_{(aq)}$$

or the reactions:

$$2KOH_{(aq)}+CO_{2(aq)} \rightarrow K_2CO_{3(aq)}+H_2O_{(l)}$$

$$Ca(OH)_{2(aq)}+K_2CO_{3(aq)} \rightarrow CaCO_{3(s)}+KOH_{(aq)};$$

or is suitable for controlling the flow of atmospheric air so that the absorber/precipitator has the adequate amount of $CO_2$ to react the amount of flow of alkaline substance fed to the absorber/precipitator according to the reactions described above to optimize the production of a flow of PCC suspension.

8. A method to improve the efficiency of $CO_2$ capture and storage using precipitated calcium carbonate, the method comprising steps of:
   providing an electric calciner;
   feeding to the electric calciner a flow of electric energy and a flow of carbonate to obtain the calcination of the flow of carbonate according to the reaction:

$$CaCO_{3(s)} \rightarrow CaO_{(s)}+CO_{2(g)};$$

releasing at the outlet from the electric calciner a flow of carbonic gas and a flow of oxide;
   providing a contactor;
   conveying the flow of carbonic gas to the contactor;
   providing a dosing device for the buffering substance;
   conveying the flow of oxide or a flow of hydroxide to the dosing device for the buffering substance;
   from the dosing device for the buffering substance obtaining a flow of buffering substance and a flow of alkaline substance;
   feeding to the contactor the flow of carbonic gas produced by the electric calciner, a predetermined flow of water and a flow of dosed PCC to obtain a flow of ionic mixture via reactions:

$$CO_{2(aq)}+H_2O_{(l)} \rightleftharpoons H_2CO_{3(aq)} \rightleftharpoons H^+_{(aq)}+HCO_{3(aq)}^-$$

e $$CaCO_{3(s)}+CO_{2(aq)}+H_2O_{(l)} \rightarrow Ca(HCO_3)_{2(aq)}$$

releasing at the outlet from the contactor the flow of ionic mixture;
   conveying the flow of ionic mixture;
   conveying the flow of buffering substance;
   providing an apparatus for pH correction;
   feeding the apparatus for pH correction with the flow of ionic mixture and with the predetermined flow of buffering substance;
   releasing at the outlet of the apparatus for pH correction a flow of buffered ionic mixture;
   providing an absorber/precipitator;
   feeding the flow of alkaline substance to the absorber/precipitator;
   feeding a flow of atmospheric air to the absorber/precipitator so that the reaction of the $CO_2$ present in it takes place with the flow of alkaline substance) following the reactions:

$$2NaOH_{(aq)}+CO_{2(aq)} \rightarrow Na_2CO_{3(aq)}+H_2O_{(l)}$$

$$Ca(OH)_{2(aq)}+Na_2CO_{3(aq)} \rightarrow CaCO_{3(s)}+NaOH_{(aq)};$$

or the reactions:

$$2KOH_{(aq)}+CO_{2(aq)} \rightarrow K_2CO_{3(aq)}+H_2O_{(l)}$$

$$Ca(OH)_{2(aq)}+K_2CO_{3(aq)} \rightarrow CaCO_{3(s)}+KOH_{(aq)};$$

releasing at the outlet from the absorber/precipitator a flow of PCC suspension and a flow of lean atmospheric air;
   providing a separator;
   feeding the flow of PCC suspension to the separator so that a flow of PCC is separated from a flow of basic solution;
   recirculating the flow of basic solution released by the separator to the absorber/precipitator;
   providing a PCC dosing device;
   feeding the flow of PCC to the PCC dosing device;
   releasing at the outlet from the PCC dosing device the predetermined flow of dosed PCC and a predetermined flow of excess PCC;
   feeding the predetermined flow of dosed PCC to the contactor so that the reaction takes place:

$$CaCO_3+CO_2+H_2O \rightarrow Ca(HCO_3)_2;$$

and making available the predetermined flow of excess PCC.

9. The method in accordance with claim 8, to improve the efficiency of $CO_2$ capture and storage using precipitated calcium carbonate comprising the steps of:
   providing a hydroxide production unit;
   feeding the flow of oxide and a predetermined flow of water to the hydroxide production unit so that the reaction takes place:

$$CaO_{(s)}+H_2O_{(l)} \rightarrow Ca(OH)_{2(s)};$$

and
   releasing at the outlet from the hydroxide production unit at least a flow of hydroxide.

10. The method in accordance with claim 8, wherein the flow of alkaline substance that feeds the absorber/precipitator is a flow of hydroxide.

\* \* \* \* \*